United States Patent [19]

Hamrick et al.

[11] 4,372,389

[45] Feb. 8, 1983

[54] DOWNHOLE WATER PUMP AND METHOD OF USE

[75] Inventors: Joseph T. Hamrick, Roanoke; Leslie C. Rose, Franklin Heights, both of Va.

[73] Assignee: Well-Pack Systems, Inc., Fort Worth, Tex.

[21] Appl. No.: 41,797

[22] Filed: May 23, 1979

Related U.S. Application Data

[63] Continuation-in-part of Ser. No. 803,525, Jun. 6, 1977, abandoned.

[51] Int. Cl.³ .................... E21B 33/127; E21B 43/00
[52] U.S. Cl. .................... 166/369; 166/106; 166/387
[58] Field of Search ............ 166/314, 68, 68.5, 106, 166/369, 381, 387, 379; 417/360, 424

[56] References Cited

U.S. PATENT DOCUMENTS

| | | | |
|---|---|---|---|
| 821,653 | 5/1906 | Layne | 166/106 |
| 1,000,583 | 8/1911 | Cooper | 166/106 |
| 1,374,116 | 4/1921 | Schorr | 166/106 |
| 1,428,238 | 9/1922 | Keating | 417/421 |
| 2,227,729 | 1/1941 | Lynes | 166/106 |
| 2,267,459 | 12/1941 | Hait | 417/501 |
| 3,123,143 | 3/1964 | Annis et al. | 417/360 |
| 3,503,445 | 3/1970 | Cochrum et al. | 166/187 |
| 3,907,463 | 9/1975 | Eller et al. | 417/360 |

FOREIGN PATENT DOCUMENTS

2311981  12/1976  France ................ 417/360

Primary Examiner—Stephen J. Novosad
Attorney, Agent, or Firm—Arthur F. Zobal

[57] ABSTRACT

A borehole water pump having an inflatable packer to permit the borehole casing to be used as the water conduit to the surface. The pump may be operated by a line shaft extending from the surface or by a downhole electric or hydraulic motor. In another embodiment the system utilizes a column pipe with outlet apertures formed through the wall thereof above the packer for allowing flow to the surface by way of the column pipe and the annulus between the column pipe and the borehole wall.

13 Claims, 9 Drawing Figures

DOWNHOLE WATER PUMP AND METHOD OF USE

This application is a continuation in-part of U.S. Patent Application Ser. No. 803,525, filed June 6, 1977 and now abandoned.

BACKGROUND OF THE INVENTION

Water lift heights for wells vary from a few feet to approximately four hundred feet in many areas of the United States. The wells that furnish water for irrigation produce at rates varying from approximately three hundred gallons per minute to above three thousand gallons per minute. The pumps are normally submerged multistage centrifugals and are referred to as turbine pumps. They are normally driven by line shafts extending from the top of the well to the pump. Spider supports and bearings at approximately ten-foot intervals hold the line shaft inside of and concentric with a pipe which serves as a conduit from the pump to the surface. This conduit pipe which is frequently six or more inches in diameter with the pump attached to its lower end, must be inserted into or removed from the well casing with heavy equipment which must be moved to and set up at the well site at considerable expense. The cost frequently inhibits removal of the pump from the well for maintenance or replacement.

SUMMARY OF THE INVENTION

It is an object of the present invention to provide a downhole pump system to alleviate or minimize the insertion and removal problems and thereby allow easier maintenance.

It is a further object of the present invention to provide a downhole pump system which results in more efficient pumping operations and the reduction of piping costs.

In one aspect the downhole pump system comprises a pump having a lower inlet and structure having an outlet in fluid communication with the borehole for allowing water to flow to the surface by way of the borehole casing. Drive means is provided for operating said pump and an inflatable packer is located in the borehole around said pump system between said inlet and outlet.

In one embodiment, the drive means comprises a drive shaft coupled to said pump and which extends through the borehole to the surface.

In a further embodiment a column pipe extends from the pump to the surface for providing a flow path from the pump to the surface. The drive means comprises a drive shaft which is coupled to the pump and extends through the column pipe to the surface. Said outlet extends through the wall of the column pipe for providing a flow path to the annulus between the column pipe and the cased wall of the borehole.

In other embodiments, said drive means comprises an electric or hydraulic motor located in the borehole.

In the embodiments disclosed, a fluid conduit is coupled to the packer and extends to the surface through the borehole to provide a flow path for fluid from the surface to the packer for inflating the packer for forming a seal between said pump system and the wall of the cased borehole. Deflating means is provided for releasing the pressure in the packer to the borehole for deflating the packer.

DESCRIPTION OF THE PREFERRED EMBODIMENT

Figure 1:
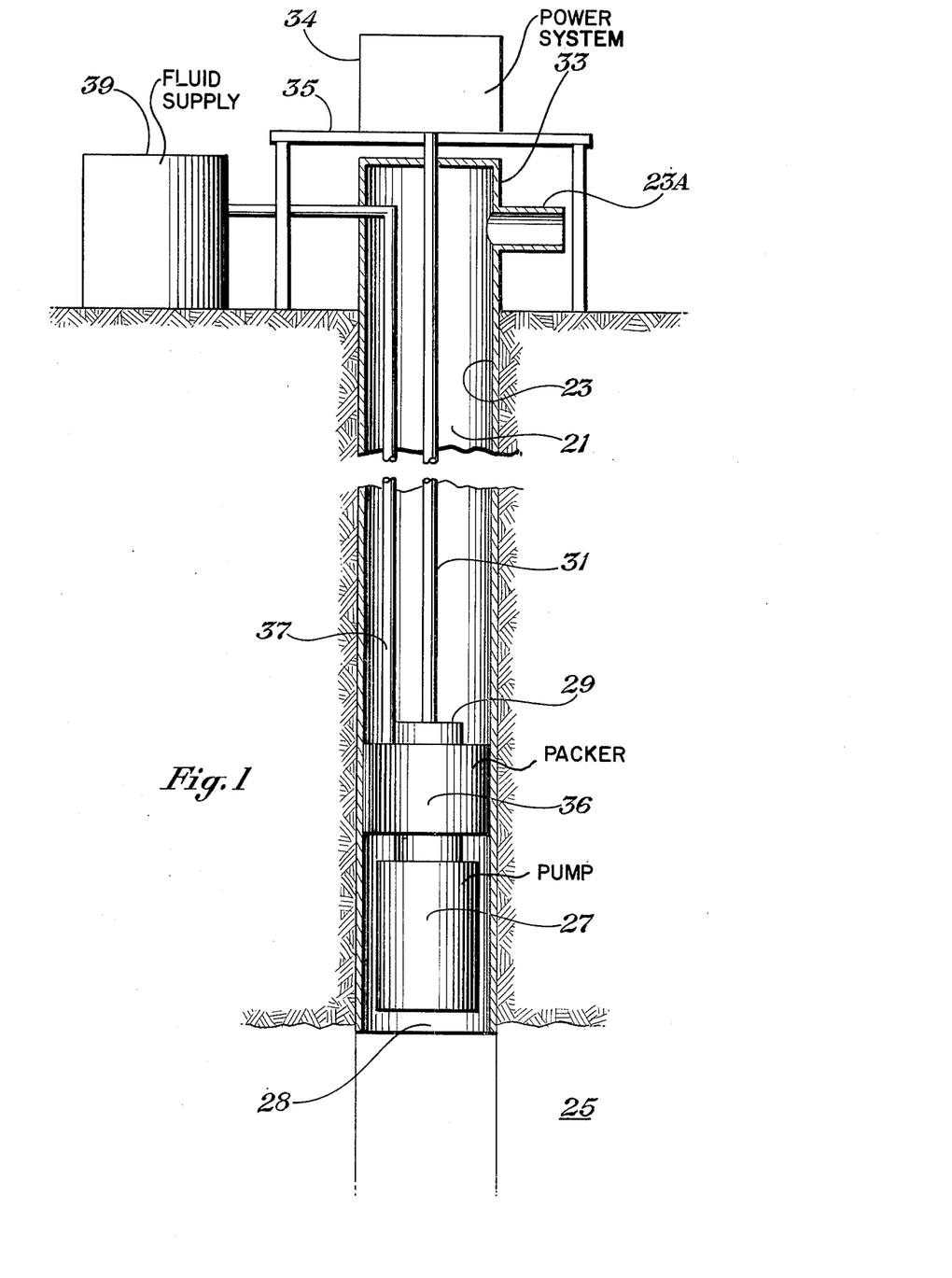
FIG. 1 illustrates one embodiment of the downhole pump system of the present invention.
Figure 2:
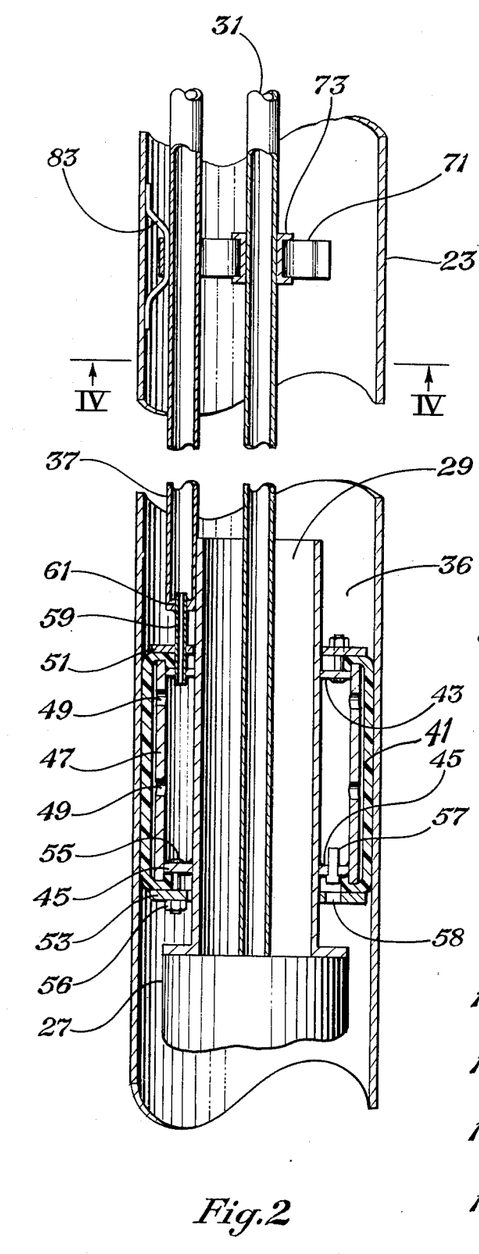
FIG. 2 is an enlarged partial cross-section of the lower portion of the system of FIG. 1.

Referring now to FIG. 1, there is shown a borehole 21 lined with steel casing 23 extending from the surface to a water bearing formation 25. Located in the borehole near the level of the formation 25 is a centrifugal pump 27 also referred to as a turbine pump. The inlet of the pump 27 is identified by reference number 28. Referring also to FIG. 2, the top of the pump has an outlet conduit 29 secured thereto and which extends upward a short distance. A line shaft 31 is coupled to the pump and extends upward through the conduit 29 and through the borehole to the surface. At the surface, the line shaft 31 extends through a top plate 33 to a power system 34, supported by platform 35, for rotating the shaft 31 to drive the pump. Power system 34 may be a gasoline, or diesel powered engine, an electric motor, or a windmill. Located around outlet conduit 29 is an inflatable packer 36. A fluid conduit 37 extends from the packer to the surface to a fluid supply 39.

Figure 3:
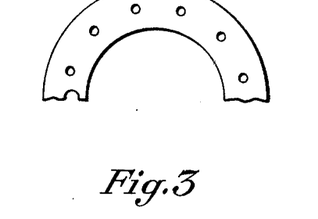
FIG. 3 illustrates a component part of the system of FIGS. 1 and 2.

Referring specifically to FIG. 2, the packer 36 comprises a resilient and expandable member or boot 41 which may be formed of neoprene reinforced with fibrous material such as nylon to prevent it from failing under torsional load. Two spaced apart annular plates 43 and 45 are welded to the outlet conduit 29. An annular member 47 having openings 49 is welded to plates 43 and 45. The upper and lower ends of boot 41 are sealed to the plates 43 and 45 by pressure from annular plates 51 and 53 which are held in place by studs 55 and nuts 56. The studs 55 are welded to plates 43 and 45. The plates 51 and 53 are segmented for ease of assembly. A segment 51A of plate 51 is shown in FIG. 3. An unloading valve 57 is coupled to the lower plate 45 and is in fluid communication with the borehole by way of an opening 58 formed through plate 53.

Fluid conduit 37 is welded to the top of outlet conduit 29 and is in fluid communication with the interior of the packer 36 by way of a small tube 59 which extends through lower lid 61 of conduit 37 and through plates 43 and 51. Tube 59 is sealed to lid 61 and to plates 43 and 51.

Figure 4:
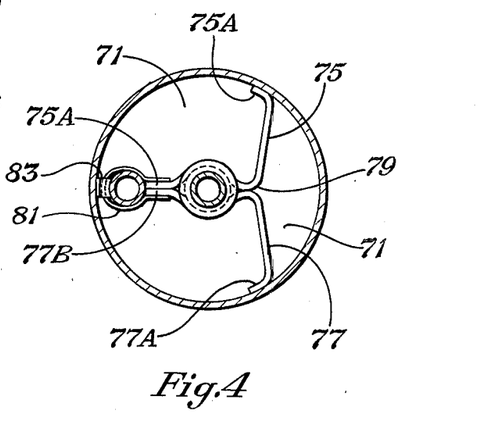
FIG. 4 is a cross-section of FIG. 2 taken through the lines IV—IV thereof.

The conduit 37 holds a plurality of vertically spaced spider supports 71 which are employed for supporting bearings 73 and maintaining line shaft 31 concentric with the casing 23. In FIG. 1, the spider supports 71 are not illustrated although they will be located at regularly spaced intervals. As seen in FIG. 4, each spider support comprises three legs formed by two members 75 and 77 which surround the bearing 73 and have ends 75A and 77A which engage the wall of the casing 23. Members 75 and 77 are bolted together at 79 and have ends 75B and 77B which are bolted together. A C-shaped member 81 is secured around conduit 37 and has its free ends secured to the ends 75B and 77B. Extending through the C-shaped member 81 is a spring 83 which engages the casing wall and serves to hold the spider support 71 firmly to the casing 23.

The downhole pump is located in the borehole by lowering the pump 27 and packer 36 connected to a section of line shaft 31 and conduit 37. As the section is lowered another section of line shaft 31 and conduit 37 with the spider supports and bearings are assembled to the first section and lowering continues in this manner with the next section being assembled to the last section until the pump has been lowered to the desired position in the casing. The conduit 37 then is secured to the top of the well casing and charged with fluid from supply 39 for inflating the packer 36 to a pressure which will assure adequate force on boot 41 to form a seal against leakage of water back into the well below the packer and to prevent the pump body from rotating. In use the power means 34 is operated to rotate the line shaft to drive the pump 27. Water in the borehole from formation 25 is pumped upward through the casing 23 and drawn off through an outlet 23A.

In one embodiment, the fluid used to inflate the packer may be water. In this example for a 100 horsepower drive rotating at 1,760 RPM, a torque of 298 foot pounds is exerted on the pump it is driving. For a twelve-inch diameter well casing, a tangential counter force of 597 pounds would be required at the casing wall. With a boot 41 twelve inches long and a friction co-efficient of 0.29, a water pressure of 4.6 psi would be required to prevent movement between the boot and the casing.

When it is desired to relieve the pressure on the boot 41 so that the packer and pump may be withdrawn from the casing, the pressure differential across the packer may be relieved by applying enough pressure to unloading valve 57 to open and latch it in place. The required opening pressure will be somewhat higher than that required to pressurize the boot 41 for sealing. Pressure operated unloading valves are commercially available. They consists essentially of a hydraulically operated valve with a spring operated latch that falls in place when the valve is opened and prevents it from closing until the latch is tripped. In this case, the latch will be tripped manually after the pump and packer are brought to the surface.

Instead of water, the fluid employed for pressurizing the packer may be air. With air inflation, no special downhole release mechanism would be required and release may be effected by an uphole vent. With the use of water for inflation, a small motor-driven pump or hand pump coupled to the conduit 37 uphole may be required for actuating the unloading valve 57 to release the packer from the casing. The advantage of the use of water for inflation purposes over air is that the typical farmer usually does not have a source of high pressure air near his well site.

Thus it can be seen that the system of FIGS. 1–5 provides a pump, piping and drive assembly that can be inserted or withdrawn from a well with relatively lightweight equipment. It eliminates the requirement for a delivery conduit for water other than the well casing, and in the process reduces the friction loss from pump to surface. For example, for a six hundred gpm delivery through a six-inch pipe with a two-inch line shaft, the head loss is seven feet of water per one hundred feet of pipe. For a twelve-inch pipe with a two-inch line shaft, the loss in head is less than one foot of water per one hundred feet.

Figure 6:
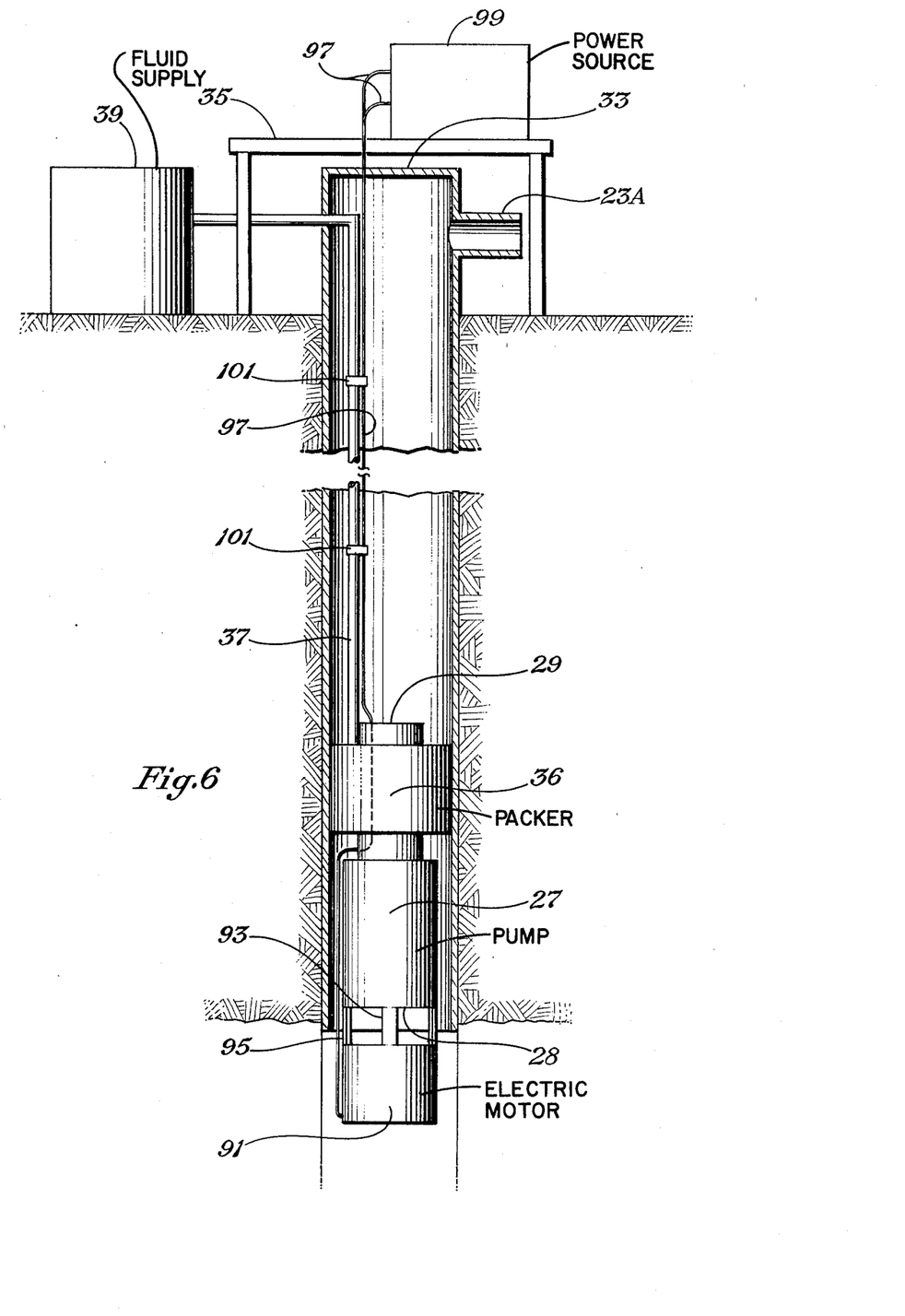
FIG. 6 illustrates another embodiment of the present invention.

Referring now to FIG. 6, the system shown is the same as that of FIGS. 1 and 2 except that a downhole electric motor 91 having its drive shaft 93 coupled to the pump 27 is used to drive the pump. The line shaft 31 and power system 34 are not used. The motor 91 is supported by spaced rods 95 connected to the pump. Electrical leads 97 extend from an uphole power source 99 to the motor for energizing the motor. The leads 97 are clamped to the conduit 37 by clamps 101 and extend into outlet conduit 29 and through a sealed access hole in its wall below the packer 36 to the motor.

Figure 7:
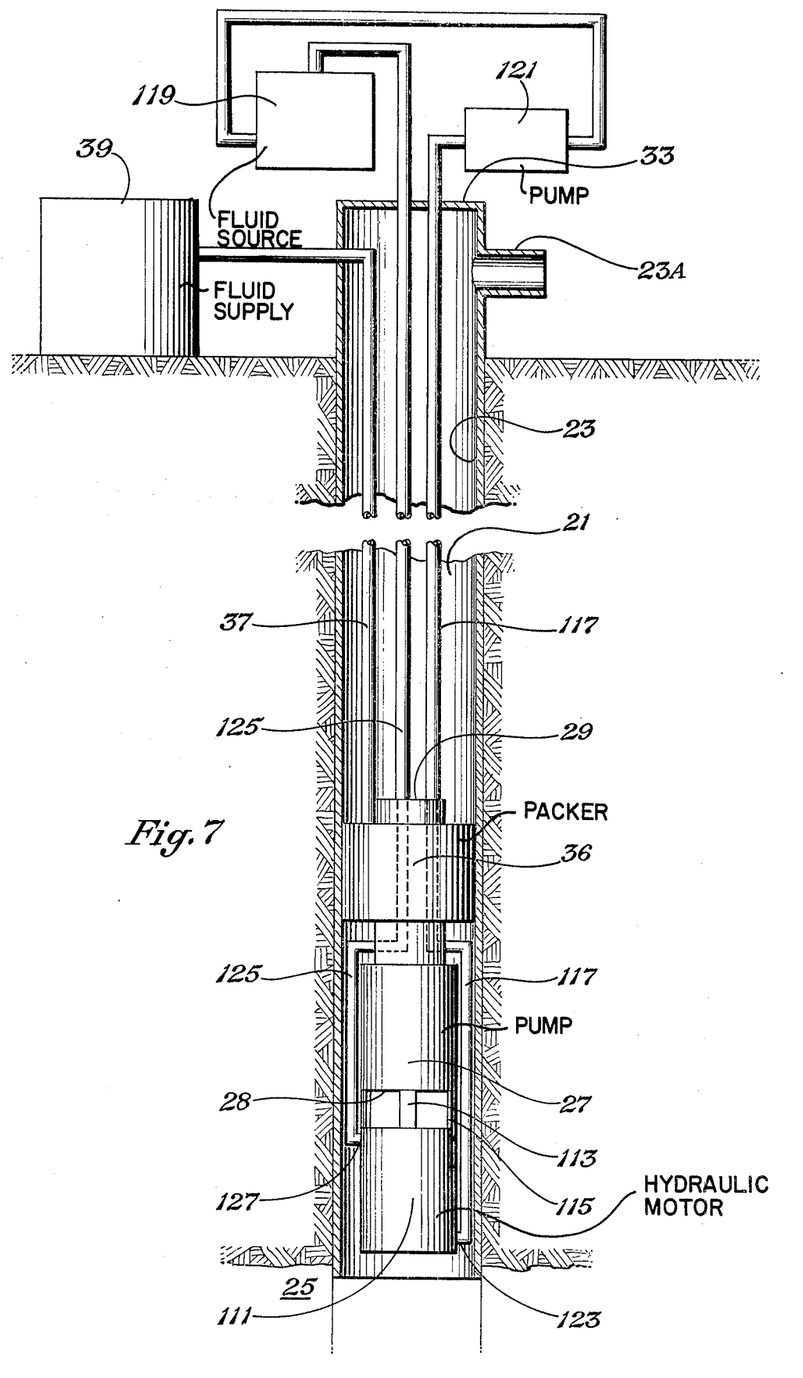
FIG. 7 illustrates a further embodiment of the present invention.

Referring to FIG. 7, the system shown is the same as that of FIGS. 1 and 2 except that a downhole hydraulic motor 111 having its drive shaft 113 coupled to the pump 27 is used to drive the pump. The line shaft 31 and power system 34 are not used. The hydraulic motor may be a hydraulic pump run as a motor and may be of the gear type, vane type, or piston type. The motor 111 is supported by spaced rods 115 connected to the pump. With an oil driven hydraulic motor, two pipes from the surface are required, but for a water driven turbine only one pipe from the surface is required since the water can be discharged back into the well. A fluid conduit 117 extends from a fluid source 119 and pump 121 at the surface through the borehole 21 to the fluid input 123 of the motor. If the operating fluid for the motor 111 is oil, a conduit 125 will extend from the output 127 of the motor upward through the borehole to the source 119. Both of the conduits 117 and 125 extend into the outlet conduit 29 and through sealed holes in its wall below the packer 36. If the operating fluid for the motor 111 is water, conduit 125 may be eliminated and water discharged from the motor 111 through its outlet 127 into the borehole.

Figure 5:
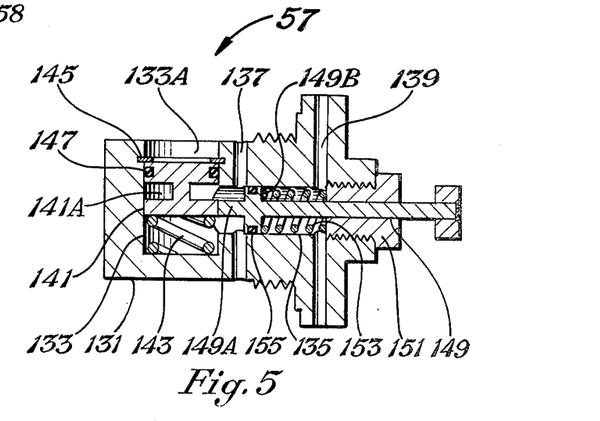
FIG. 5 illustrates an unloading valve.

Referring now to FIG. 5, there will be described an unloading valve which may be used in the embodiments of FIGS. 1 and 2, 6, and 7 if water is used as the fluid for inflating the packer. It is to be appreciated that when the valve 57 is installed in the packer 36 as shown in FIG. 2, it is oriented so that the right hand portion thereof is downwardly placed when the packer is installed in the well. The valve comprises a housing 131 which is threaded into an opening formed in annular plate 45. The housing has two cylindrical apertures 133 and 135 in fluid communication with each other and two vents 137 and 139 in fluid communication with aperture 135. When the housing 131 is threaded in place, the opening 133A of aperture 133 and vent 137 will be exposed to the interior of the packer and vent 139 will be exposed to the borehole through opening 58 (See FIG. 2). A pressure operated, spool shaped piston 141 is located in aperture 133 and is biased toward its opening 133A by a spring 143. A snap ring retainer 145 limits outward movement of the piston 141. An o-ring 147 forms a seal between the top rim of the piston 141 and the wall of the aperture 133.

A moveable pin 149 is located in aperture 135 and extends outward through an opening formed through plug 151 which is threaded into the aperture 135. A spring 153 biases the end 149A of the pin 149 toward the piston 141. O-ring 155 coupled to the enlarged cylindrical portion 149B of the pin 149, forms a seal between the cylindrical portion 149B and the wall of the aperture 135. The valve is shown in a closed position in FIG. 5.

When it is desired to deflate the packer to remove the downhole system, the fluid pressure within the packer is increased sufficiently to cause the piston 141 to move downward against the spring 143 until the end 149A of the pin is forced by the spring 153 into the space 141A between the two rims of the piston 141. When this occurs, fluid within the packer may pass outward through vent 137, aperture 135, and vent 139. The valve is latched in the open position by the spring 153 and pin 149. When the system has been brought to the surface, the valve may be closed by pulling the pin 149 backward to remove its end from the space 141A to allow the spring 143 to move the piston 141 to the position shown in FIG. 5. In this position the end 149A of the pin 149 engages the lower rim of the piston 141.

Instead of using the valve 57 for releasing the pressure in the boot 41, a rupturable disc may be substituted for the valve. The disc will be constructed such that it will rupture when the pressure in the boot 41 increases to a given level above that required to pressurize or inflate the boot 41 for sealing purposes. Upon release of the pressure in the boot to the borehole, the boot will deflate sufficient to allow the pump system to be removed from the borehole.

In the event that the turbine pump 27 is of the type that water will drain downward through the pump from its outlet to its inlet, the pressure within the boot 41 may be released by forming the tube 59 such that it will rupture when the pressure in the tube increases to a given level above that required to pressurize and inflate the boot 41. For this purpose, the tube 59 may be formed of synthetic rubber having its ends clamped to the end of conduit 37 and to plate 43. In this embodiment, the rupturable tube will be employed in lieu of the valve 57 or rupturable disc described above.

Most water wells now in operation which employ downhole pumps, use turbine pumps normally driven by line shafts extending from the top of the well to the pump. Spider supports and bearings hold the line shaft inside of and concentric with column pipe which serves as a water conduit from the pump to the surface. Before the current energy crisis, it was common in the irrigation trade to use a small diameter column pipe to save on pipe and installation cost. The use of smaller diameter pipe results in a greater water friction loss and hence decreases the effiency of the pump resulting in an increase in the use of fuel. When natural gas, gasoline, disel fuel, and electricity were lower in cost than at the present time, the economics of the situation favored the smaller pipe and a maximum of six feet of water friction loss per one hundred feet of column pipe was deemed to be acceptable. This is not the case at the present time.

Figure 8A:
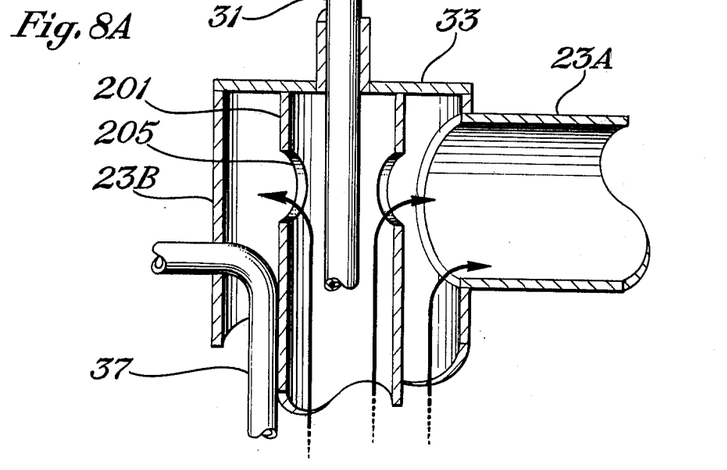
FIGS. 8A and 8B disclose an embodiment which utilizes a packer with a column pipe having outlet apertures formed through the wall thereof above the packer for providing flow to the surface by way of the column pipe and the annulus between the column pipe and borehole wall.
Figure 8B:
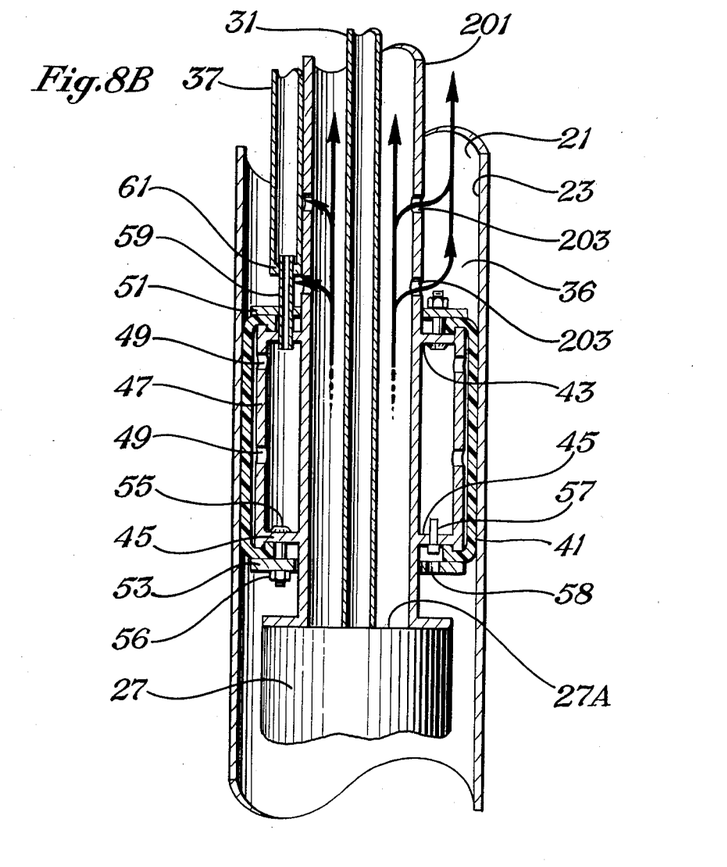

In accordance with the embodiment of FIGS. 8A and 8B, there is provided a method and system which will increase the effiency of existing wells having a column pipe extending upward from the pump to the surface. The pump, line shaft, and column pipe are removed and a packer is installed around the column pipe relatively close to the pump. Perforations are cut in the column pipe above the packer and the pump, line shaft, and column pipe with the packer are inserted back into the well. Upon operation of the pump, water will flow upward to the surface through the column pipe and through the annulus between the column pipe and the wall of the borehole. Thus water friction loss is decreased and pumping effiency is increased. For most existing wells, the loss in head can be reduced well below one foot per one hundred feet of pipe. For example, the loss in head for a five inch diameter column pipe with a flow of 700 GPM and a one inch diameter line shaft would be twenty feet of water per one hundred feet of pipe which is a prohibitive loss. With the use of a packer and access holes formed in the column pipe, the loss in head with a five inch column pipe would drop well below one foot per one hundred feet of pipe.

Referring now to FIGS. 8A and 8B, like reference numerals identify like components as disclosed in FIGS. 1–5 and described previously in the specification. The differences in the embodiment of FIGS. 8A and 8B from that of FIGS. 1–5 is that the short outlet 29 is not employed and a column pipe 201 is attached to the outlet 27A of the pump 27 and extends to the surface to the well head 23B where it is attached to top plate 33. The line shaft or drive shaft 31 extends upward through the column pipe 201 to the surface. At the surface, the drive shaft extends through top plate 33 of the well head 23B to the power system 34 (See FIG. 1) which may be a gasoline, or disel powered engine, an electric motor, or a windmill. The specific spider supports of FIG. 2 will not be employed, however, suitable spider supports and bearings will be employed at spaced apart intervals to hold the drive shaft inside of and concentric with the column pipe 201. The line shaft may be of the type that it is enclosed which oil lubricated bearings or open with water lubricated bearings. The packer 36 is installed around the column pipe 201 and conduit 37 is attached to the pipe 201.

A plurality of apertures 203 are formed through the column pipe 201 above the packer 36 to provide a flow path from the column pipe 201 to the annulus formed between the column pipe 201 and the borehole wall 23. At the surface, a plurality of apertures 205 are formed through the column pipe 201 to provide a flow path from the column pipe to the annulus. The total cross-sectional area of the apertures 203 will be suitably matched with that of apertures 205. In operation, water from the pump 27 flows upward to the surface through column pipe 201. It also flows through apertures 203 to the annulus formed between the column pipe 201 and the borehole wall 23 and upward to the surface through the annulus. At the surface, water is drawn off from the annulus and from the column pipe 201 through outlet 23A. Thus water friction loss is decreased and pumping effiency is increased allowing a saving in fuel cost.

The use of a packer requires a sealed casing from the point of packer installation upward. It is estimated that two-thirds of the wells in the high plains and three-fourths of the wells overall in Texas are cased to the bottom. The number of wells in Nebraska that are cased to the bottom is believed to be high. The number of wells that are cased to the bottom in the San Joaquin Valley in California appears to be high but perforations in the casing follow erratic patterns in some areas due to the stratification of the aquifers. Where there are perforations in the casing, the packer must be situated above them with an adequate size column pipe extending down to the pump.

It is to be understood that the embodiment of FIGS. 8A and 8B may be employed in new installations. In new installations, the column pipe need be only large enough to support the pump and packer against the pumped head. Thus the embodiment of FIGS. 8A and 8B allows the use of the size of column pipe that is most economical and still maintains minimum flow restriction.

An advantage offered by a packer in addition to reducing friction losses is the much lighter weight of the assembly. For example, in a ten or twelve inch diameter well where the total hydrostatic force on the packer and pump is relatively small, column pipes as small as two and one half inches in diameter may be used. Such a lightweight assembly lends itself to removal and replacement by the owner with a tripod and chain hoist, making it less expensive to make seasonal overhauls of the system. With wells in the sixteen-inch diameter range, four to five inch diameter column pipes will be needed, depending on the installed depth of the packer. The use of high strength alloy pipe will allow use of smaller pipe and accordingly significant system weight reduction. The friction of the rubber boot against the casing is adequate to support the packer and pump against the pumped head, but at this point it is only used for backup. With the use of a packer and access holes in the column pipe above the packer, the delivery friction losses in most cases can be reduced well below one foot per one hundred feet of casing.

We claim:

1. A system for pumping water from sub-surface formations to the surface through a cased borehole and a column pipe, comprising:
   pump means located in the borehole and having lower inlet means and upper outlet means,
   a column pipe coupled to said outlet means of said pump means and extending to the surface through the cased borehole for providing a flow path to the surface,
   a drive shaft coupled to said pump means for operating said pump means,
   said drive shaft extending to the surface through said column pipe,
   power means located at the surface for rotating said drive shaft,
   aperture means formed through the wall of said column pipe in the borehole relatively near said pump means for providing a flow path from said column pipe to the annulus between said column pipe and the cased wall of the borehole,
   an annular inflatable packer adapted to engage the cased wall of the borehole when inflated, located in the borehole between said inlet means of said pump means and said aperture means formed through said column pipe,
   means for use for inflating said packer,
   means for deflating said packer
   discharge means at the surface in fluid communication with said annulus and with said column pipe for discharging water from said annulus and from said column pipe.

2. The system of claim 1, wherein:
   said means for use for inflating said packer comprises a conduit coupled to said packer and extending to the surface through said borehole to provide a fluid flow path from the surface to said packer for inflating said packer.

3. The system of claim 2, wherein:
   said conduit provides a flow path for liquid for inflating said packer,
   said means for deflating said packer comprises release means located in the borehole and coupled to said packer for releasing the pressure in said packer to the borehole.

4. The system of claim 3, comprising:
   means at the surface for supplying liquid to said conduit means for inflating said packer.

5. The system of claim 3 or 4, wherein:
   said release means comprises a pressure responsive means for releasing the pressure in said packer to the borehole when the pressure increases to a given level above that required to inflate said packer.

6. A method of increasing the efficiency of a borehole water pump system comprising a pump having an inlet and an outlet, a column pipe coupled to the outlet of said pump and extendable to the surface, and a drive shaft coupled to the pump and extendable to the surface through said column pipe, comprising the steps of:
   forming an opening through the wall of said column pipe near said pump,
   installing an inflatable packer around said borehole pump system between said inlet of said pump and said opening of said column pipe,
   locating said pump, inflatable packer, column pipe, and drive shaft in a cased borehole with said column pipe and drive shaft extending to the surface,
   inflating said packer to form a seal between said pump system and the wall of the borehole,
   with power means located at the surface, rotating said drive shaft to operate said pump to flow water up to the surface through said column pipe and through said opening formed through the wall of said column pipe into the annulus formed between said column pipe and the wall of said borehole,
   flowing water in said annulus upward to the surface, and
   at the surface discharging water from said column pipe and from said annulus.

7. A method of increasing the efficiency of a water pump system located in a cased borehole, said water pump system comprising a pump located in said borehole and having a lower inlet and upper outlet, a column pipe coupled to said outlet and extending to the surface, and drive shaft coupled to said pump and extending to the surface through said column pipe, said method comprising the steps of:
   removing said column pipe, said drive shaft, and said pump from the borehole,
   forming an opening through the wall of said column pipe near said pump,
   installing an inflatable packer around said pump system between said inlet of said pump and said opening of said column pipe,
   locating said pump, inflatable packer, column pipe, and drive shaft in a cased borehole with said column pipe and drive shaft extending to the surface,
   inflating said packer to form a seal between said pump system and the wall of the borehole,
   with power means located at the surface, rotating said drive shaft to operate said pump to flow water upward to the surface through said column pipe and through said opening formed through the wall of said column pipe into the annulus formed between said column pipe and the wall of said borehole,
   flowing water in said annulus upward to the surface, and
   at the surface discharging water from said column pipe and from said annulus.

8. A system for pumping water from sub-surface formations to the surface through a cased borehole and a column pipe, comprising:
- pump means located in the borehole and having lower inlet means and upper outlet means,
- a column pipe coupled to said outlet means of said pump means and extending to the surface through the cased borehole for providing a flow path to the surface,
- said column pipe being spaced inward from the wall of said cased borehole defining an annulus between said column pipe and the wall of said cased borehole,
- means for operating said pump means,
- aperture means formed through the wall of said column pipe in the borehole relatively near said pump means for providing a flow path from said column pipe to the annulus between said column pipe and the wall of the cased borehole,
- annular packer means located in the borehole between said inlet means of said pump means and said aperture means formed through said column pipe for engaging the wall of the cased borehole, and
- discharge means at the surface in fluid communication with said annulus and with said column pipe for discharging water from said annulus and from said column pipe.

9. The system of claim 8 wherein:
- said annular packer means is located around said column pipe and forms a seal between said column pipe and the wall of the cased borehole.

10. A method of pumping water from sub-surface formations to the surface through a cased borehole and a column pipe wherein said column pipe extends from the surface through the borehole to a lower level and has a pump coupled to its lower end with apertures formed through said column pipe near said pump, said pump having a lower inlet and an upper outlet, said method comprising the steps of:
- forming a seal between said column pipe and the wall of the cased borehole at a level between said apertures formed through said column pipe and said inlet of said pump,
- operating said pump to pump water, in the borehole, from said inlet to said outlet of said pump,
- flowing water to the surface through said column pipe,
- flowing water through said apertures into the annulus between said column pipe and the wall of the cased borehole and to the surface by way of said annulus, and
- at the surface discharging water from said column pipe and from said annulus.

11. A system for pumping water from sub-surface formations to the surface through a cased borehole and a pipe means located within the cased borehole, comprising:
- pump means located in the borehole and having lower inlet means and upper outlet means,
- a pipe means coupled to said outlet means of said pump means and extending to the surface through the cased borehole for providing a flow path to the surface,
- said pipe means being spaced inward from the wall of said cased borehole defining an annulus between said pipe means and the wall of said cased borehole,
- means for operating said pump means,
- aperture means formed through said pipe means in the borehole relatively near said pump means for providing a flow path from said pipe means to the annulus between said pipe means and the wall of the cased borehole,
- annular packer means located in the borehole between said inlet means of said pump means and said aperture means formed through said pipe means for engaging the wall of the cased borehole, and
- discharge means at the surface in fluid communication with said annulus and with said pipe means for discharging water from said annulus and from said pipe means.

12. The system of claim 11 wherein:
- said annular packer means is located around said pipe means and forms a seal between said pipe means and the wall of the cased borehole.

13. A method of pumping water from sub-surface formations to the surface through a cased borehole and a pipe means wherein said pipe means extends from the surface through the borehole to a lower level and has a pump means coupled to its lower end with aperture means formed through said pipe means near said pump means, said pump means having a lower inlet means and an upper outlet means, said method comprising the steps of:
- forming a seal between said pipe means and the wall of the cased borehole at a level between said aperture means formed through said pipe means and said inlet means of said pump means,
- operating said pump means to pump water, in the borehole, from said inlet means to said outlet means of said pump means,
- flowing water to the surface through said pipe means,
- flowing water through said aperture means into the annulus between said pipe means and the wall of the cased borehole and to the surface by way of said annulus, and
- at the surface discharging water from said pipe means and from said annulus.

* * * * *